United States Patent Office 3,206,275
Patented Sept. 14, 1965

3,206,275
PULSATION PROCESS OF GAS TREATMENT
FOR FUMIGATION AND THE LIKE
Louis Sair, Evergreen Park, and Harry J. Pappas, La
Grange, Ill., assignors to The Griffith Laboratories, Inc.,
Chicago, Ill., a corporation of Illinois
No Drawing. Filed Dec. 15, 1961, Ser. No. 159,760
9 Claims. (Cl. 21—58)

The present invention relates to the gaseous treatment of materials for so-called fumigation and sterilization.

Many and varied processes are known by which a wide variety of materials is subjected to an active gas. The gas may be active to kill insect life, such as weevils, their eggs and larvae in flour and grains, or more potent to kill active and dormant bacteria, yeasts and molds. Some processes are carried out at superatmospheric pressure and others at normal and subatmospheric pressures.

The present invention relates to those processes carried out in closed retorts which may operate at or above or below atmospheric pressure, wherein the retort is loaded with material to be treated, and then charged with the treating gas, either with or without prior evacuation, all at conditions well known in the art, which are specific to the gas, to the materials involved, and to the extent of kill desired.

For reducing the counts of bacteria, yeasts and molds, more drastic action is required than for so-called insect control. Such processes are described in U.S. Patents Nos. 2,080,179, 2,189,948, 2,189,949, Re. 22,284, 2,938,-766, and others.

Among the gases which have been used are ethylene oxide propylene oxide, mixtures of each of these with carbon dioxide or with halogenated hydrocarbons, methyl formate alon and mixed with carbon dioxide, methyl bromide, hydrocyanic acid gas, and others.

Commercially, such processes are carried out in retorts. Large-sized retorts and large volumes of bulk material in the retort present problems. In retorts stratification of the gas and pocketing in corners can occur where the gas is static. Also, in corners or other places, residual air and moisture vapor can be pocketed and compressed into a pocket, as gas is introduced in charging the retort.

More importantly, however, within large masses or bodies of material, a similar condition prevails. The reference to large masses herein includes material so packed or packaged that there is at least one region to be reached by the gas only by passing through an appreciable extent of the mass. This is exemplified by a mass of comminuted material loaded in a tote-bin, which may be wheeled into a retort. Even though the gas can readily pass through the walls and bottom of such a bin, the center of the load must be reached by gas passing through the material to the center.

Another example of more common occurrence is the practice of packing material such as ground spices in commercial open-top drums about 22 inches in diameter and 3 feet high. Double liners or bags of gas-impermeable polyethylene may be employed so that the gas may reach the bottom of the drum only through the top of the drum at the unsealed liner.

Situations such as above and others give rise to a lesser degree of "kill" where the gas must pass through the material. Specifically, it has been found that in a drum as described, static conditions in a retort can effect a low degree of kill at the bottom of a drum and a high degree of kill at the top of the drum.

It is believed from experience with the present invention, that when gas is introduced into a retort, which is never 100% free of the original air and water vapor, the residual air or vapor in pockets, such as within packed or compacted material in a drum open to the treating gas only at the top, is compressed to smaller volume, and forced ahead of the treating gas. This either prevents contact of the gas and material, or so dilutes the gas that it is less effective than where it acts in a less diluted state. This condition may not last unchanged through the period of gassing because of gaseous diffusion. As diffusion may take place the treating gas becomes less diluted in such pocket regions, but the period of its exposure to the material is shorter than, say at the top of a drum.

The present invention is based upon a discovery that in upsetting a static condition in an acting retort by repeatedly withdrawing gas and introducing gas, a substantially uniform kill can be effected where otherwise in a static retort a highly unequal kill may result.

It is, therefore, an object of the invention to minimize the unequality of kill in a gassing retort by eliminating the static condition not only in the retort but within the material being treated.

It is a particular object of the invention to keep the gas in motion by changing the pressure of the gas in a closed retort and within the mass being gassed.

It is another particular object of the invention to change such pressure by pulsation, and preferably, to do so continuously as by repeated cycles of pressure change during the gassing period.

The invention may be carried out in present commercial retorts in several ways. First, the conventional initiation of gassing is carried out, by loading the open retort, sealing it, in some cases evacuating it, preferably to a vacuum of 29 inches of mercury—the higher the better—and then introducing an amount and kind of gas called for by the extent and kind of kill desired. From this point on, the material may be exposed to the gas for a required period, exemplifying a static process. In a static process, the retort may be evacuated to remove the gas after completion of the treating process, preferably to as high a degree of vacuum as any initial evacuation, and then opened to the entry of air or sterilized air as is required to permit opening the retort and removal of the load.

The present invention differs from any conventional static process by pulsating changes in the overall pressure of gas in the retort. This results in changing the pressure in all the contents of the retort. By a pulsating change of pressure, the gas moves within the material and minimizes or eliminates any pockets of air or of moisture vapor which may insulate material from contact with the gas, or which may dilute the gas.

The pulsating may be effected by drawing out gas after the original charge, then introducing gas, which may be a fresh supply, or stored gas from the withdrawal. A pump may be operated to effect this movement and it can be easily operated to produce repeated identical cycles of any desired frequency.

Since it is the pressure of the gas in the retort rather than the amount of gas which is present, another way is to change the volume of the fixed amount of gas in the retort, either by enlarging and ensmalling the retort itself, or by changing the volume of a gas-impermeable body within the retort. A plunger properly sealed may be moved in and out of the retort. To avoid mechanical problems in using such a plunger, a suitable inflatable body, such as a balloon or a metal bellows, may reside in the retort with its interior piped to outside the retort. Through the pipe the body is variably inflated and deflated to effect the desired pulsating changes in pressure.

The invention is not limited to any particular gas or gassing conditions, or to any particular material to be fumigated for insect control, or reduced in its content of bacteria, yeasts and molds. Materials which are commonly gassed include tobacco, spices, cocoa, flour, rice, grains, starch, dehydrated vegetables, seeds, nuts and nut meats, raisins, prunes, apricots and other items.

The problems encountered are greater with ground materials tightly packed in large drums, as described, to be fumigated or depleted in content of microorganisms, for commercial sale, shipment and storage. The following examples illustrate the invention.

EXAMPLE 1

Ground red pepper is packed in a conventional 300 pound drum, 22 inches in diameter and 36 inches high, lined with two layers of polyethylene film which is substantially impervious to propylene oxide. A control drum so packed is placed alone in a retort of approximate size, 6 x 3.5 x 13 feet. The sealed retort with wall temperature of 110° F. is evacuated to a vacuum of 29 inches of mercury. Into the evacuated retort is introduced 40 pounds of propylene oxide gas, reducing the vacuum to 14 inches of mercury. The retort is maintained static for three hours, evacuated and flushed with air, and then opened as described above.

Then a similar drum is used and the retort closed and similarly evacuated and charged with the same amount of gas. Then, by means of a pump, gas is introduced and removed so as to change the vacuum in 10-minute regular cycles for three hours, between the limits of 14 and 16 inches of mercury. The retort is then opened as described.

The following Table I shows the kill in the static control and the pulsating process.

The initial content of the red pepper is given under "control." The processed drum of the present invention was sampled at the top, middle and bottom for counting the surviving organisms per gram.

*Table I*

| Control | Bacteria | | Yeasts and Molds | |
|---|---|---|---|---|
| | Static | Pulse | Static | Pulse |
| | (500,000) | | (8,000) | |
| Top | 5,000 | 706 | 300 | 100 |
| Middle | 4,000 | 100 | 700 | 90 |
| Bottom | 70,000 | 22,000 | 1,100 | 500 |

EXAMPLE 2

Ground paprika packed in a 300 pound drum as in Example 1, was similarly processed by comparing static and pulsating gases in the manner of Example 1. The walls of the retort of Example 1 were at 115° F. and a quantity of 25 pounds of propylene oxide gas was admitted, dropping the vacuum from 29 inches to between 9 and 10 inches of mercury. Then static gassing continued for 3 hours on this control.

A similar test drum was charged and initially gassed in the same way, reducing the vacuum to 13 inches of mercury. Then by means of a gas pump, the vacuum was changed in 30-minute regular cycles between the limits of 12 and 23 inches in three hours. Table II shows the results sampled as in Example 1.

*Table II*

| Control | Bacteria | | Yeasts and Molds | |
|---|---|---|---|---|
| | Static | Pulse | Static | Pulse |
| | (1,200,000) | | (1,000) | |
| Top | 13,000 | 2,000 | 20 | 0 |
| Middle | 300,000 | 3,000 | 100 | 0 |
| Bottom | 450,000 | 35,000 | 100 | 0 |

EXAMPLE 3

Ground paprika in a 300 pound drum as in Example 1 lined with two layers of polyethylene film, was placed in the retort of Example 1, evacuated to 29 inches of mercury, then 40 pounds of propylene oxide were introduced, lowering the vacuum to 14 inches. Then 7-minute cycles of pressure change in three hours were effected. The change involved departures of 1 to 2 inches from said 14 inches with the pressure constantly recorded on a chart.

Table III shows the final count of bacteria per gram.

*Table III*

| | |
|---|---|
| Control | 800,000 |
| Top of drum | 7,000 |
| Middle of drum | 800 |
| Bottom of drum | 1,100 |

This constitutes a high and uniform kill. The higher count at the top probably resulted from the greater exposure of the top in the subsequent steps prior to sampling for analysis.

EXAMPLE 4

An elongated tube 3.5 x 25 inches, open at but one end, made of plastic film such as used to encase ground meat products, is tightly packed with ground paprika. The film material is chosen for its substantial impermeability to propylene oxide.

The filled tube was placed in a retort having wall temperatures in the range from 100° to 105° F., the retort evacuated to 29 inches of mercury, and then, charged with 40 pounds of propylene oxide. This reduced the vacuum to 10 inches of mercury.

A static gassing period of 4 hours followed. This was repeated as described for 4 hours using 13 cycles per hour of pressure change from between 9 and 11 inches of mercury. The following Table IV shows the final counts of bacteria, yeasts and molds per gram in the original paprika, in the static batch and in the pulsated batch, and the depth in the tube where the sample was taken.

*Table IV*

| Depth—Control | Bacteria | | Yeasts and Molds | |
|---|---|---|---|---|
| | Static | Pulse | Static | Pulse |
| | (10,000,000) | | (3,000) | |
| Top—0 Inches | 3,000 | 1,000 | 200 | 100 |
| 15 Inches | 1,500,000 | 50,000 | 400 | 300 |
| 20 Inches | 3,000,000 | 680,000 | 700 | 500 |
| 25 Inches | 6,000,000 | 1,500,000 | 1,000 | 500 |

There may be other phenomena taking place, such as a constant bombarding by pulsating molecules of the gas. Also, in the case of material high in moisture content tightly held, reduction of pressure induces slow release of moisture during a gassing period. In a static process, such released moisture tends to form an insulating layer at the surface, which by the present invention, is pulsated to induce its diffusion into the gas.

Broadly, the process contemplates changing the pressure in the retort in order to effect motion of the gas adjacent the surfaces of the material to be treated. Regularity is not required. Although closely spaced intermittent pulses may be used, it is more practicable to use mechanical means operating continuously with repetitive cycles, as disclosed in the foregoing examples. However, more than one such means may be provided, each to impart different changes, such as two gas pumps operating to produce repetitive cycles. These may be operated to combine their cycles and give an irregular cycle having greater amplitude than the cycle of each. With such means, the extra one of them may be operated for a short time at the beginning of the treatment period to give an extra push of the gas into the material, greater than that which the second imparts.

As exemplified above, the gassing pressure for propylene oxide has been at subatmospheric pressure for a high degree of kill. A pulsating change of pressure as small as 1 inch is effective, as shown in Example 3, and as high as 11 inches as shown in Example 2.

The invention is not to be considered as limited to or by the illustrative examples, and many variations of conditions, some of which have been given, are contemplated as falling within the scope of the invention as expressed in the appended claims.

We claim:

1. In a method of continuously subjecting material in a closed chamber to an active treating gas of constant composition for reducing the count of organic life in said material, the improvement which comprises creating a pulsating movement of said gas in the chamber by changing, a plurality of times, the overall gaseous pressure in said chamber between higher and lower effective treating pressures, said effective treating pressures being not less than a vacuum of about 23 inches of mercury.

2. The method of claim 1 in which the changing of the pressure is continuous.

3. The method of claim 1 in which the changing of pressure is effected by cyclic changes.

4. The method of claim 1 in which the change of pressure is effected by repeated substantially uniform cycles of change.

5. The method of claim 1 in which the change in pressure is effected by alternately moving gas into and out of the retort.

6. In the method of continuously subjecting material in a closed chamber to an active treating gas of constant composition for reducing the count of organic life in said material, which material is present in bulk mass requiring passage of the gas through a portion of the mass, the improvement which comprises creating a pulsating movement of said gas in the chamber and in the bulk mass by changing, a plurality of times, the overall gaseous pressure in said chamber between higher and lower effective treating pressures, said effective treating pressures being not less than a vacuum of about 23 inches of mercury.

7. In the method of continuously subjecting material in a closed chamber to an active treating gas of constant composition for reducing the count of organic life in said material, which material is present in bulk mass in an open-top container requiring passage of gas through the material from top to the bottom of the container, the improvement which comprises creating a pulsating movement of said gas in the chamber and in the bulk mass by changing, a plurality of times, the overall gaseous pressure in said chamber between higher and lower effective treating pressures, said effective treating pressures being not less than a vacuum of about 23 inches of mercury.

8. The method of treating material with an active treating gas of constant composition for reducing the count of organic life comprising evacuating air from a closed retort containing the material, admitting the treating gas to reach an effective treating pressure and thereby lowering the degree of evacuation in the retort, then creating pulsating movement of the gas by changing, a plurality of times, the resulting subatmospheric pressure in the retort between higher and lower effective treating pressures, said effective treating pressures being not less than a vacuum of about 23 inches of mercury.

9. The method of treating a bulk mass of material with an active treating gas of constant composition to reduce the content of microorganisms including bacteria, yeasts and molds which comprises evacuating air from a retort containing a bulk mass, admitting said treating gas including an effective content of gas selected from the group consisting of ethylene oxide and propylene oxide and thereby lowering the degree of evacuation in the retort to an effective treating value, and then effecting pulsating movement of the gas in the retort during an effective period of action by changing, a plurality of times, the overall gaseous pressure in the retort between higher and lower effective treating pressures, said effective treating pressures being not less than a vacuum of about 23 inches of mercury.

References Cited by the Examiner

UNITED STATES PATENTS

| 2,119,837 | 6/38 | Wehrle | 21—109 |
| 2,131,134 | 9/38 | Baer et al. | 21—58 |
| 2,868,616 | 1/59 | Poitras | 21—56 |

MORRIS O. WOLK, *Primary Examiner.*

DONALL H. SYLVESTER, WILLIAM B. KNIGHT,
*Examiners.*